(12) United States Patent
Lee et al.

(10) Patent No.: US 7,881,200 B2
(45) Date of Patent: Feb. 1, 2011

(54) METHOD OF CONTROLLING TRANSMISSION RATE AND COMMUNICATION DEVICE USING THE SAME

(75) Inventors: Keun-jae Lee, Suwon-si (KR); Sang-su Nam, Seoul (KR); Byung-in Mun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 610 days.

(21) Appl. No.: 11/525,080

(22) Filed: Sep. 22, 2006

(65) Prior Publication Data

US 2007/0070892 A1 Mar. 29, 2007

(30) Foreign Application Priority Data

Sep. 23, 2005 (KR) .................... 10-2005-0088915

(51) Int. Cl.
*G01R 31/08* (2006.01)
*H04W 4/00* (2009.01)
(52) U.S. Cl. ...................................... 370/235; 370/331
(58) Field of Classification Search ........................ None
See application file for complete search history.

(56) References Cited

U.S. PATENT DOCUMENTS

| | | | | |
|---|---|---|---|---|
| 6,741,555 | B1 * | 5/2004 | Li et al. ........................ | 370/229 |
| 6,876,639 | B1 * | 4/2005 | Cao ............................ | 370/331 |
| 2002/0150048 | A1 * | 10/2002 | Ha et al. ...................... | 370/231 |
| 2005/0022089 | A1 | 1/2005 | Le et al. | |
| 2005/0144303 | A1 * | 6/2005 | Zhang et al. ................. | 709/231 |
| 2006/0114830 | A1 * | 6/2006 | Shimonishi et al. ......... | 370/241 |
| 2006/0120328 | A1 * | 6/2006 | Wright et al. ............... | 370/331 |
| 2008/0084826 | A1 * | 4/2008 | Ong ........................... | 370/237 |
| 2009/0168701 | A1 * | 7/2009 | White et al. ................. | 370/328 |

FOREIGN PATENT DOCUMENTS

| | | |
|---|---|---|
| JP | 2002-247630 A | 8/2002 |
| JP | 2004-357307 A | 12/2004 |

(Continued)

OTHER PUBLICATIONS

Tabery, Peter et al.: "Handoff-Triggered TCP (hot-TCP): Performance and Fairness Evaluation", Vehicular Technology Conference, 2004,. VTC2004-Fall, 2004 IEEE 60th Los Angeles, CA, Sep. 26-29, 2004, Piscataway, NJ, pp. 3181-3185, XP010787460, ISBN: 0-7803-8521-7.

(Continued)

*Primary Examiner*—Aung S Moe
*Assistant Examiner*—Jutai Kao
(74) *Attorney, Agent, or Firm*—Sughrue Mion, PLLC

(57) ABSTRACT

A method of controlling a transmission rate and a communication device using the same are disclosed. A method of controlling a transmission rate includes changing a path for packet transmission/reception from a first path to a second path, setting a congestion window and a slow-start threshold to be used in the second path to a congestion window and a slow-start threshold used in the first path, and adapting the congestion window and the slow-start threshold to be used in the second path according to a packet loss generated in the second path.

14 Claims, 7 Drawing Sheets

FOREIGN PATENT DOCUMENTS

KR    10-2001-0043592 A    5/2001

OTHER PUBLICATIONS

Iyengar J. R. et al: "Preventing SCTP Congestion Window Overgrowth During Changeover draft-iyengar-sctp-cacc-00.txt" IETF Standard-Working-Draft, Internet Engineering Task Force, IETF, CH, Feb. 22, 2002, pp. 3,5,6,7, XP015003761, ISSN: 0000-0004.

Izumikawa H. et al: "An efficient TCP with 1, 2, explicit handover notification for mobile networks" Wireless Communications and Networking Conference, 2004, WCNC, 2004 IEEE Atlanta, GA, USA Mar. 21-25, Piscataway, NJ, USA, IEEE, vol. 2, Mar. 21, 2004, pp. 647-652, XP010709539, ISBN: 0-7803-8344-3.

Taeyeon Park, et al., "Adaptive Handover Control in IP-Based Mobility Networks", Dec. 2002, Australia.

* cited by examiner

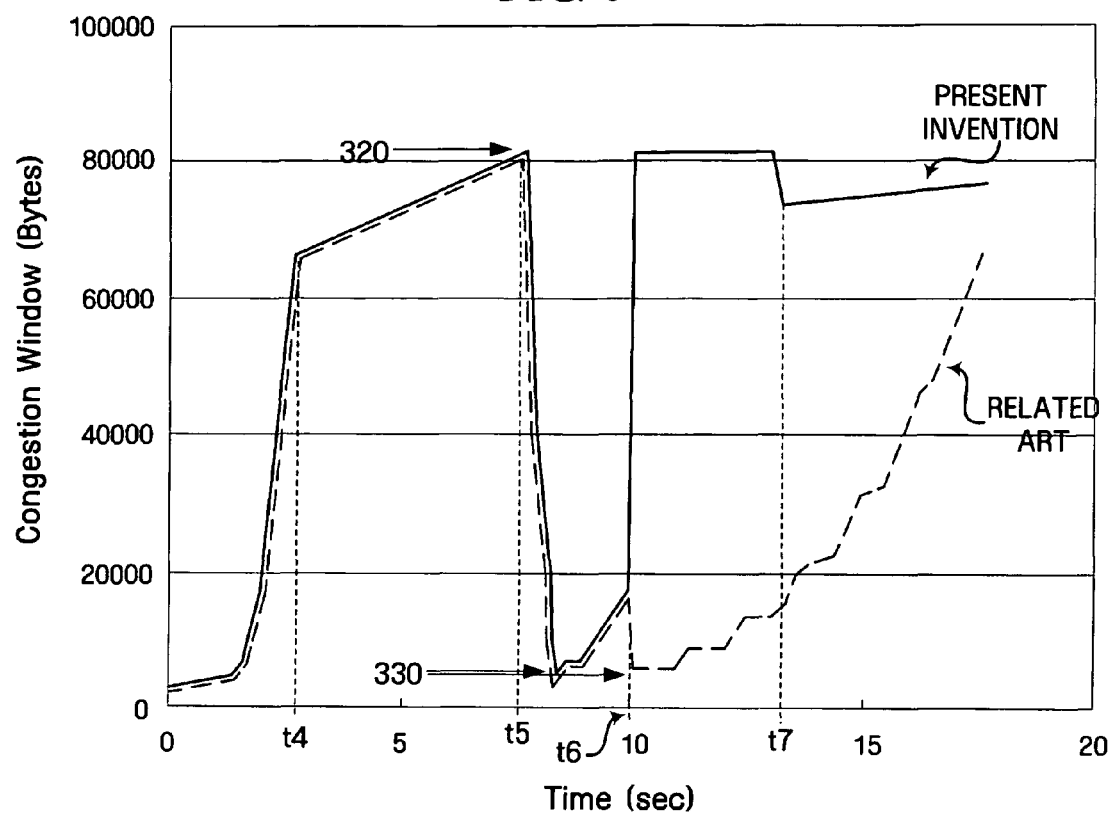

METHOD OF CONTROLLING TRANSMISSION RATE AND COMMUNICATION DEVICE USING THE SAME

CROSS-REFERENCE TO RELATED APPLICATIONS

This application claims priority from Korean Patent Application No. 10-2005-0088915 filed on Sep. 23, 2005 in the Korean Intellectual Property Office, the disclosures of which are incorporated herein by reference in their entirety.

BACKGROUND OF THE INVENTION

1. Field of the Invention

Methods and apparatuses consistent with the present invention relate to controlling a transmission rate, and more particularly, to a method of controlling a transmission rate based on a transmission protocol which supports multi-homing, and to a communication device using the same.

2. Description of the Related Art

Stream Control Transmission Protocol (SCTP) is a next-generation transmission protocol following Transmission Control Protocol (TCP) and User Datagram Protocol (UDP). Similar to the TCP, the SCTP provides connection-oriented, reliable data transmission. In particular, the error and flow control of the SCTP is the same as that of the TCP.

One of the main differences between the SCTP and the TCP is that multi-homing and multi-streaming are supported. For example, multi-homing allows multiple paths to be used for packet transmission between communication devices. In this case, if a problem occurs in one path, another path can be used, and thus multi-homing provides seamless packet transmission between the communication devices.

A path for packet transmission is changed, for example, upon handover of the communication device. In the related art, when the path is changed, as shown in FIG. 1, like an initial process of a session, a congestion window is set to a default value (10), regardless of the communication environment of a new path. Then, the communication device controls a transmission rate through a slow-start process (20) and a congestion avoidance process (30), and thus the data transmission amount during the handover is drastically reduced and then is gradually increased. With respect to the above, service quality is greatly influenced according to kinds of service to be used by the communication device. For example, when the communication device is executing a voice call service using Voice over Internet Protocol (VoIP), a call delay may be long. Further, when the communication device is using a streaming service, video dropping and blocking may occur.

Accordingly, a technique which can keep the transmission rate uniform even though the path for packet transmission is changed when packet transmission is based on multi-homing is demanded.

Korean Unexamined Patent Publication No. 2001-0043592, entitled "Soft Handoff in Cellular Mobile Communication Network", discloses a soft handoff technique in a cellular mobile communication network which includes signal measurement values for base transceiver stations involved in a handoff operation into one or more uplink signals and causes the individual signal measurement values to be used to represent performance of communication channels between the associated base transceiver stations and a mobile station. According to the technique described in Patent Document 1, the communication device can select a channel having excellent performance among a plurality of channels. However, Korean Unexamined Patent Publication No. 2001-0043592 does not describe a technique for allowing the communication device to perform the active control of the transmission rate.

SUMMARY OF THE INVENTION

The present invention provides a method of controlling a transmission rate which can efficiently control a transmission rate when a path for packet transmission is changed, and a communication device using the same According to an aspect of the present invention, a method of controlling a transmission rate includes changing a path for packet transmission/reception from a first path to a second path, setting a congestion window and a slow-start threshold to be used in the second path to a congestion window and a slow-start threshold used in the first path, and adapting the congestion window and the slow-start threshold to be used in the second path according to a packet loss generated in the second path.

According to another aspect of the present invention, a communication device includes a multi-homing support module which establishes a plurality of paths to be communicatable with other communication devices, sets a first path among the plurality of paths as a path for packet transmission/reception, and changes the path for packet transmission/reception to a second path among the plurality of paths upon handover, a control information managing module which sets a congestion window and a slow-start threshold to be used in the second path to a congestion window and a slow-start threshold used in the first path, and adapts the congestion window and the slow-start threshold to be used in the second path according to a packet loss generated in the second path, and a control module which controls the transmission rate according to the congestion window and the slow-start threshold to be managed by the control information managing module.

The details of other embodiments of the present invention are set forth in the accompanying drawings and the description below.

BRIEF DESCRIPTION OF THE DRAWINGS

The above and other aspects of the present invention will become more apparent by describing in detail preferred embodiments thereof with reference to the attached drawings in which:

FIG. 8 is a diagram showing a change in transmission rate of the related art and a change in transmission rate of the exemplary embodiment of the present invention according to a second simulation result for comparison.

DESCRIPTION OF THE EXEMPLARY EMBODIMENTS

Figure 1:
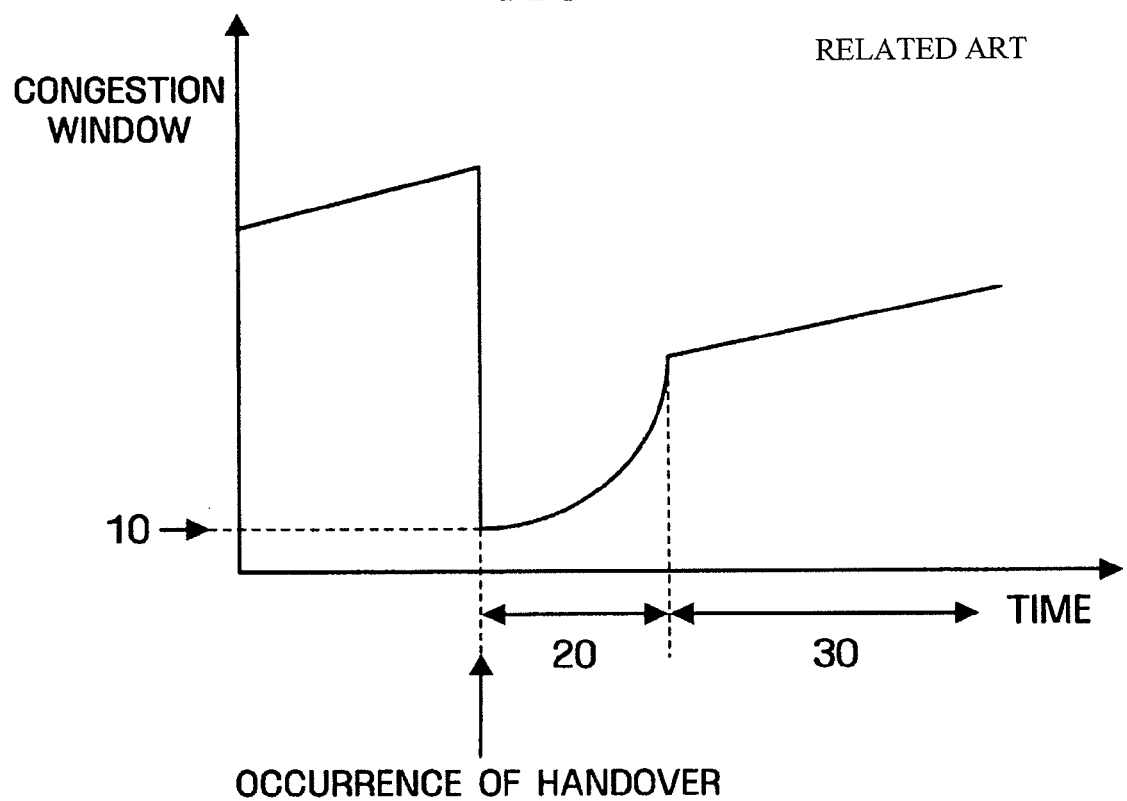
FIG. 1 is a diagram showing a change in transmission rate upon handover according to the related art.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, exemplary embodiments of the present invention will be described with reference to the accompanying drawings.

The present invention is based on a transmission protocol which supports multi-homing. As the transmission protocol which supports multi-homing, SCTP can be used. Accordingly, among the details of the invention, parts not particularly described herein can be understood through the SCTP. However, the details of the SCTP are not intended to limit the present invention, and the present invention can also be applied through other transmission protocols which support multi-homing. The SCTP standards are enacted according to Request For Comments (RFC) 2960 on, October 2000, which is described in a web site "www.ietf.org/rfc.html".

Figure 2:
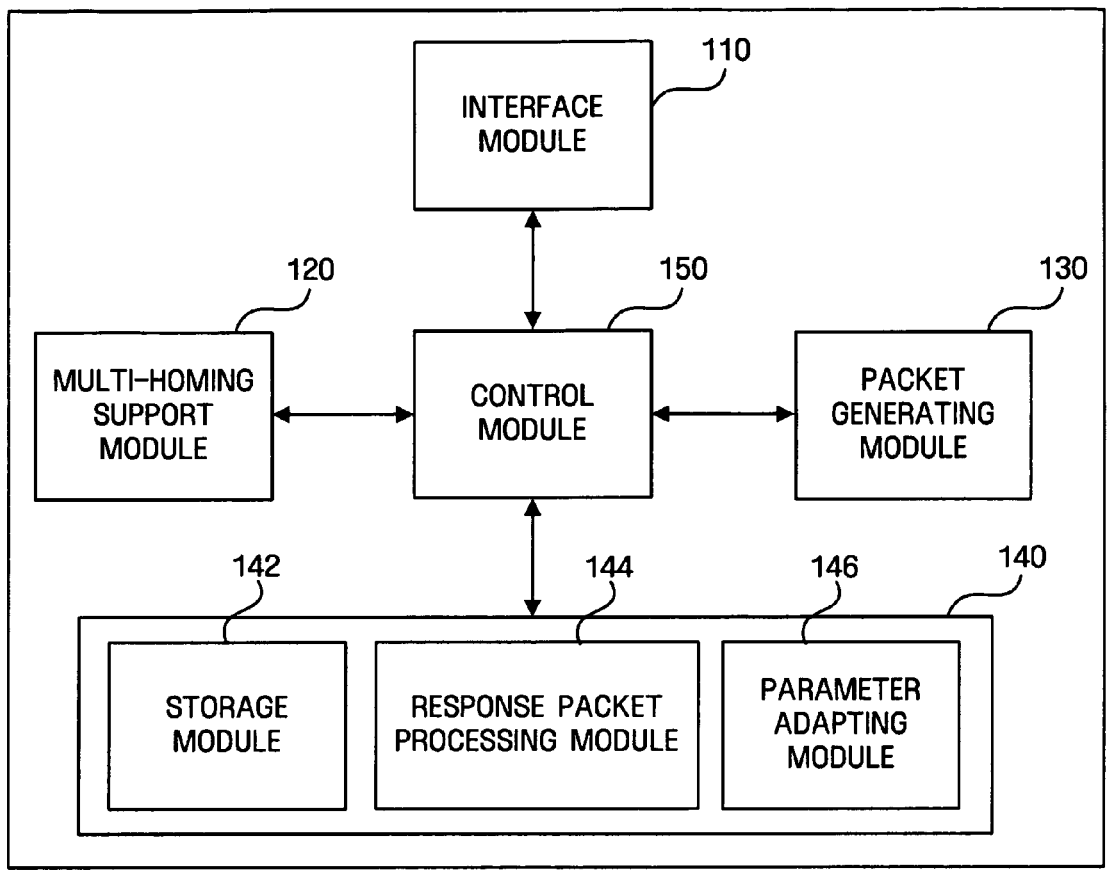
FIG. 2 is a block diagram showing a communication device according to an exemplary embodiment of the present invention.

FIG. 2 is a block diagram showing a communication device according to an exemplary embodiment of the present invention. The communication device shown in FIG. 2 is a computing device which has a wireless communication feature and ability for processing various kinds of data. As the communication device, a mobile apparatus such as a notebook computer, a personal digital assistant (PDA), or a cellular phone can be used. However, the communication device is not limited to the mobile apparatus. For example, an immobile apparatus such as a desktop computer can be used.

The communication device includes an interface module 110, a multi-homing support module 120, a packet generating module 130, a control information managing module 140, and a control module 150.

The interface module 110 performs communication with other communication devices. Hereinafter, the communication device for communication is referred to as a destination device. The interface module 120 can transmit/receive packets through wireless mediums.

The multi-homing support module 120 forms a plurality of communication connections to the destination device through the interface module 110. Here, the communication connection can be understood as the association in the SCTP. More specifically, the multi-homing support module 120 allows the communication device to have several addresses assigned thereto and establishes a plurality of paths capable of transmitting the packets to and receiving the packets from the destination device using the individual addresses. Among the plurality of paths, a path which is actually used to transmit and receive the packets is referred to as a primary path. When the packets transmitted through the primary path are lost, the remaining paths, excluding the primary path, among the plurality of paths can be used for retransmission of the lost packets.

If the change of the communication environment may have an adverse effect on the packet transmission, the multi-homing support module 120 can change the primary path. For example, in the SCTP, when a T3-rtx timer is expired for a certain address, an error counter is increased. Further, when the error counter exceeds a predetermined parameter, the path set through that address becomes inactive. Accordingly, if the primary path in use becomes inactive, the multi-homing support module 120 can set another path as the primary path.

According to the exemplary embodiment of the present invention, the multi-homing support module 120 can change the primary path upon handover of the communication device.

The packet generating module 130 generates the packets to be transmitted to the destination device. The packets generated by the packet generating module 130 include various kinds of data according to the applications to be used by the communication device. For example, multimedia data such as sound data and movie data based on the VoIP can be used.

The control information managing module 140 manages control information which is used for the control of the transmission rate by the control module 150. Here, the transmission rate control information includes a congestion window cwnd and a slow-start threshold ssthresh. In particular, when the multi-homing support module 120 changes the path for packet transmission and reception, the control information managing module 140 sets a congestion window and a slow-start threshold to be used in a changed path to the congestion window and the slow-start threshold used in a path before the change. Further, the control information managing module 140 adapts the congestion window and the slow-start threshold to be used in the changed path according to the lost packets generated in the changed path. The control information managing module 140 includes a storage module 142, a response packet processing module 144, and a parameter adapting module 146. The storage module 142 stores the control information of a predetermined transmission rate, and the response packet processing module 144 processes a response packet received from the destination device. The parameter adapting module 146 adapts the transmission rate control information which is used by the communication device. The features of the individual modules 142, 144, and 146 included in the control information managing module 140 will be described with reference to FIGS. 3 to 5.

The control module 150 controls the operations of the individual modules 110, 120, 130, 140, 142, 144, and 146 of the communication device. Further, the control module 150 controls the transmission rate according to the congestion window and the slow-start threshold which are managed by the control information managing module 140.

The individual modules of the communication device described with reference to FIG. 2 may be embodied as a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Hereinafter, the operation process of the communication device described above will be described in detail with reference to FIGS. 3 to 5. Here, the operation process of the communication device is broadly divided into a process of storing the transmission rate control information, a process of setting the transmission rate control information, and a process of adapting the transmission rate control information. A method of controlling a transmission rate according to the embodiment of the invention can be executed through these processes. The process of storing the transmission rate control information, the process of setting the transmission rate control information, and the process of adapting the transmission rate control information will be described with reference to FIGS. 3 to 5, respectively.

Figure 3:
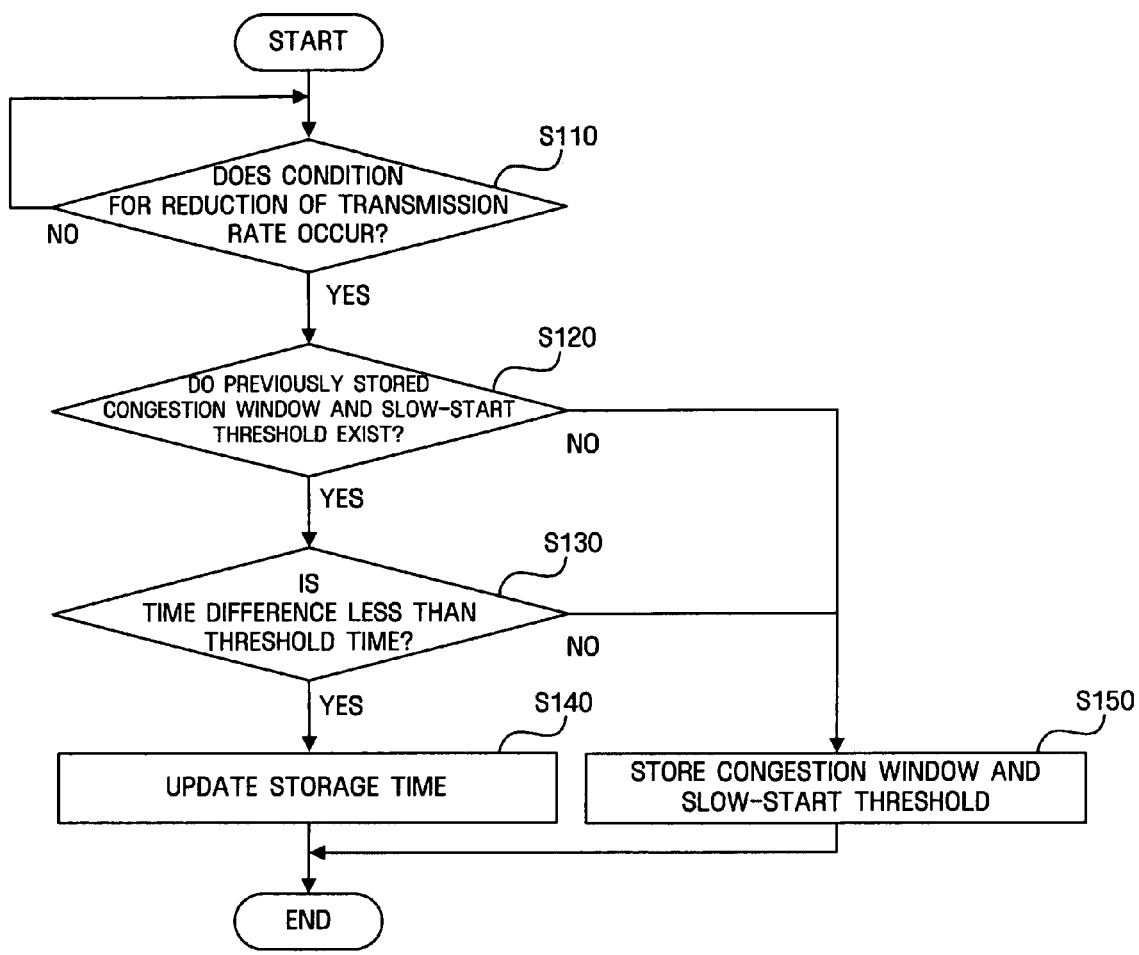
FIG. 3 is a flow chart showing a process of storing transmission rate control information according to an exemplary embodiment of the present invention.

FIG. 3 is a flow chart showing the process of storing the transmission rate control information according to an exemplary embodiment of the invention. In the present exemplary embodiment and the following embodiments, it is assumed that the communication connection to the destination device is established. A process of establishing the communication connection is known in the art, and thus the description thereof will be omitted.

The parameter adapting module 146 basically adapts the transmission rate control information according to the related art. For example, the parameter adapting module 146 adapts the transmission rate control information using slow-start algorithm, congestion avoidance algorithm, fast retransmission algorithm, and so on. The transmission rate control information includes the congestion window and the slow-start threshold. The slow-start algorithm, the congestion avoidance algorithm, and the fast retransmission algorithm are known through SCTP, TCP, and associated protocols. At this time, the control module 150 can control the transmission rate of the interface module 110 according to the congestion window which is to be adapted by the parameter adapting module 146.

If the interface module 110 transmits the packet generated by the packet generating module 130, the interface module 110 can receive the response packet from the destination device. The response packet processing module 144 determines through the response packet whether a condition for the reduction of the current transmission rate occurs (Operation S110). As an example of the condition for the reduction of the transmission rate, the occurrence of a retransmission timeout when the response packet is not received for a predetermined time or the execution of the fast retransmission algorithm when consecutive lost packets exceeding a threshold number of lost packets are generated can be exemplified. This is because the congestion window is set to the initial value upon the occurrence of the retransmission timeout or the congestion window is set to about half of the current level upon the execution of the fast retransmission algorithm.

If the response packet processing module 144 determines that the condition for the reduction of the transmission rate occurs, the storage module 142 determines whether the previously stored congestion window and slow-start threshold exist (Operation S120).

If it is determined that the previously stored congestion window and slow-start threshold exist, the storage module 142 determines whether a time difference between storage time of the stored congestion window and slow-start threshold and occurrence time of the condition for the reduction of the transmission rate is less than threshold time (Operation S130).

If it is determined that the time difference is less than the threshold time, the storage module 142 updates the storage time of the stored congestion window and slow-start threshold to the occurrence time of the condition for the reduction of the transmission rate (Operation S140).

In the meantime, if it is determined at the operation S120 that the previously stored congestion window and slow-start threshold do not exist or if it is determined at the operation S130 that the time difference is equal to or more than the threshold time even though the previously stored congestion window and slow-start threshold exist, the storage module 142 stores the congestion window and the slow-start threshold at the time when the condition for the reduction of the transmission rate occurs (S150). Accordingly, the storage module 142 stores the congestion window and the slow-start threshold immediately before the transmission rate is reduced. When the congestion window and the slow-start threshold are stored, the congestion window and the slow-start threshold previously stored in the storage module 142 can be deleted. Further, the storage module 142 can store the time when the condition for the reduction of the transmission rate occurs. Here, the time when the condition for the reduction of the transmission rate occurs is used as the storage time of the congestion window and the slow-start threshold later.

In general, immediately before the handover, link quality of the primary path is degraded, which causes an increase in packet loss. Accordingly, the congestion window and the slow-start threshold are reduced due to the retransmission timeout and the fast retransmission caused by the packet loss. Therefore, through the process in FIG. 3, the values immediately before the congestion window and the slow-start threshold are reduced are stored and then are used after the handover is completed, such that the transmission rate can be kept uniform.

Figure 4:
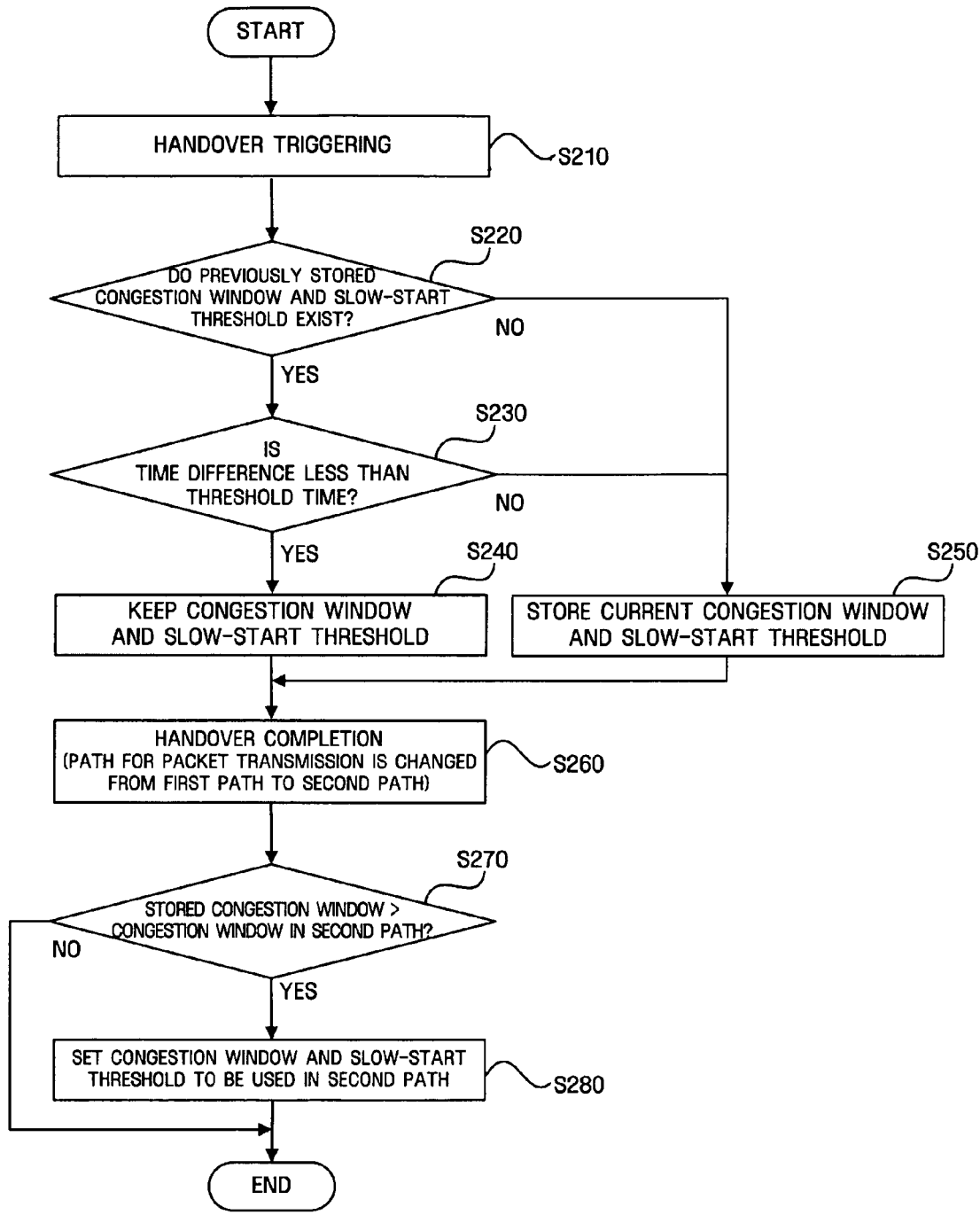
FIG. 4 is a flow chart showing a process of setting transmission rate control information according to an exemplary embodiment of the present invention.

FIG. 4 is a flow chart showing the process of setting a transmission rate according to an embodiment of the present invention.

The handover process is known, and thus the specific description thereof will be omitted.

First, if the handover is triggered through the multi-homing support module 120 (Operation S210), the storage module 142 determines whether the previously stored congestion window and slow-start threshold exist (Operation S220). The congestion window and the slow-start threshold stored in the storage module 142 can be understood through the process shown in FIG. 3.

Hereinafter, for a better understanding of the present invention, at operation S210, it is assumed that the multi-homing support module 120 changes the path for packet transmission from the first path to the second path. Here, the path for packet transmission may be the primary path of the SCTP.

If it is determined that the previously stored congestion window and slow-start threshold exist, the storage module 142 determines whether a time difference between the storage time of the stored congestion window and slow-start threshold and triggering time of the handover (that is, time when the path for packet transmission is changed from the first path to the second path) is less than threshold time (Operation S230). Here, the threshold time may preferably have the same value as the threshold time in FIG. 3, but the present invention is not limited to this configuration.

If it is determined at operation S230 that the time difference is less than the threshold time, the storage module 142 maintains the previously stored congestion window and slow-start threshold as they are (Operation S240).

In the meantime, if it is determined at operation S220 that the previously stored congestion window and slow-start threshold do not exist or if it is determined at operation S230 that the time difference is equal to or more than the threshold time even though the previously stored congestion window and slow-start threshold exist, the storage module 142 stores the current congestion window and slow-start threshold (Operation S250). Accordingly, the storage module 142 stores the congestion window and the slow-start threshold lastly used in the first path. That is, the storage module 142 can store the congestion window and the slow-start threshold immediately before the path for packet transmission is changed. When storing the congestion window and the slow-start threshold, the storage module 142 can delete the previously stored congestion window and slow-start threshold. Further, the storage module 142 can also store the storage time of the congestion window and the slow-start threshold.

Subsequently, if the handover is completed and the multi-homing support module 120 changes the path for packet transmission from the first path to the second path (Operation S260), the parameter adapting module 146 determines whether the size of the congestion window stored in the storage module 142 is larger than the size of the congestion window in the second path (Operation S270). This may be useful when the managing module 140 manages the transmission rate control information for the primary path and another path in parallel. However, operation S270 may be omitted according to the exemplary embodiments.

When it is determined that the size of the congestion window stored in the storage module 142 is larger than the size of the congestion window in the second path, the parameter adapting module 146 sets the congestion window and the slow-start threshold to be used in the second path to the congestion window and the slow-start threshold used in the first path (Operation S280). That is, when the process passes through operation S240, the congestion window and the slow-start threshold to be used in the second path are set to the congestion window and the slow-start threshold previously stored in the storage module 142. Further, when the process passes through operation S250, the congestion window and the slow-start threshold to be used in the second path are set to the congestion window and the slow-start threshold lastly used in the first path.

As described above, when operation S270 is omitted, operation S280 can be executed immediately after operation S260.

Through the process in FIG. 4, the congestion window and the slow-start threshold used before the path for packet transmission is changed is used in the changed path continuously, and thus the transmission rate can be kept uniform upon handover.

When the communication environment of the changed path is worse than the communication environment of the path before the change, maintaining the established transmission rate as it is may have an adverse effect on the packet transmission using the change path. Accordingly, the transmission rate in the changed path after handover needs to be adapted. This adaptation will be described with reference to FIG. 5.

Figure 5:
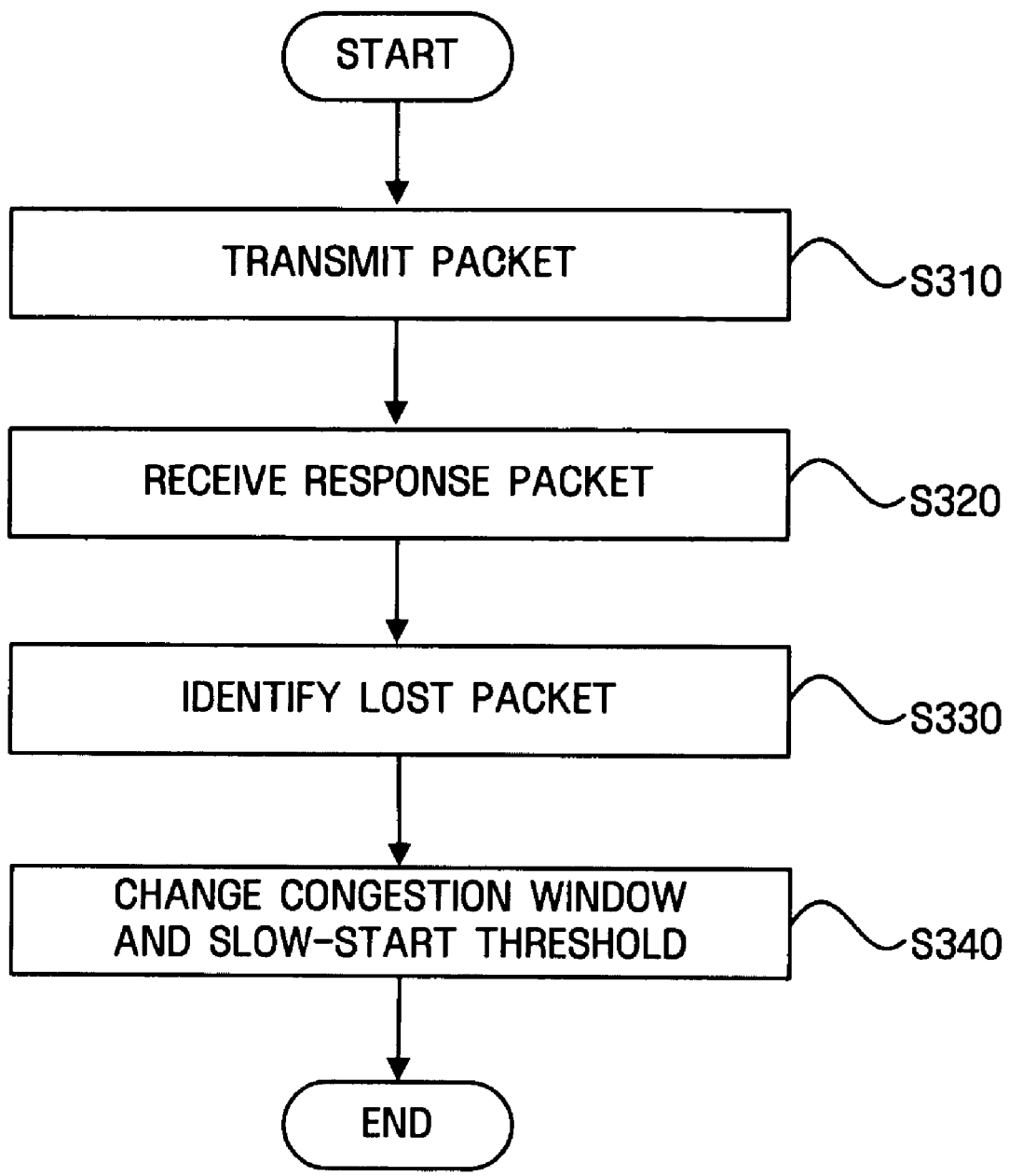
FIG. 5 is a flow chart showing a process of adapting transmission rate control information according to an exemplary embodiment of the present invention.

FIG. 5 is a flow chart showing the process of adapting the transmission rate control information according to an exemplary embodiment of the present invention.

After the path for packet transmission is changed, the interface module 110 transmits the packets by the amount corresponding to the congestion window set at operation S280 in FIG. 4 according to the control of the control module 150 (Operation S310), and receives the response packet from the destination device which receives the packets (Operation S320). Here, the response packet may be Selective Acknowledgement (SACK).

The response packet module 144 identifies lost packets among the packets transmitted at operation S310 through the received response packet (operation S330). At this time, the response packet processing module 144 can calculate the amount of lost packets.

Subsequently, the parameter adapting module 146 changes the slow-start threshold to be used in the changed path to a value obtained by subtracting the amount of lost packets identified by the response packet processing module 144 from the congestion window set at operation S280 in FIG. 4, and changes the congestion window to be used in the changed path to a value equal to the changed slow-start threshold (Operation S340). Next, a known process of controlling the transmission rate through the congestion avoidance algorithm is executed.

If the communication environment of the changed path is similar or superior to the path before the change, there is little possibility that the packet loss occurs. Accordingly, the congestion window and the slow-start threshold to be used in the changed path are rarely adapted through the process of FIG. 5. At this time, even though the path is changed, a known process of controlling the transmission rate can be immediately applied.

According to another embodiment of the present invention, at operation S340, the parameter adapting module 146 can also change the slow-start threshold to be used in the changed path using a larger value of a value, which is obtained by subtracting the amount of lost packets identified by the response packet processing module 144 from the congestion window set at operation S280, and a limit initial value of the congestion window. At the same time, the parameter adapting module 146 can change the congestion window to be used in the changed path to a value which is equal to the change slow-start threshold. Here, the limit initial value of the congestion window can have various values according to kinds of the transmission protocols, kinds of the communication devices, or network states. In the SCTP, the initial value of the congestion window is determined to be larger than 0 and equal to or smaller than 2*MTU (Maximum Transmission Unit) (0<cwnd≦2*MTU), and thus the limit initial value of the congestion window can be 2*MTU on the basis of the SCTP. Accordingly, unlike the related art, a drastic reduction in the congestion window when the path for packet transmission is changed can be prevented.

Hereinafter, the simulation result according to the application of the present invention will be described with reference to FIGS. 6 to 8. According to the simulations, in the present invention, the features of FIGS. 3 to 5 are applied on the basis of the SCTP. Meanwhile, in the related art, only the SCTP is used.

Figure 6:
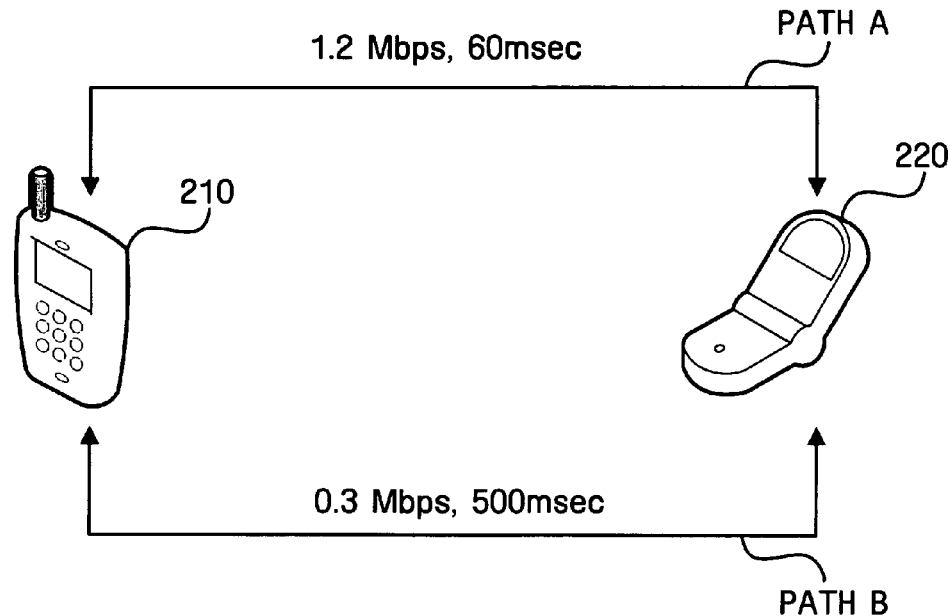
FIG. 6 is a diagram showing a communication system which executes the features according to the exemplary embodiment of the present invention.

First, as shown in FIG. 6, two communication devices 210 and 220 which can perform the features of the present invention establish the associations through two paths (path A and path B). Hereinafter, for convenience of explanation, the communication device 220 is the destination device and the description will be given, laying emphasis on the communication device 210. The communication devices 210 and 220 change the primary path from the path A to the path B. The communication environments of the path A and the path B used to perform the simulation are as described in Table 1.

TABLE 1

|  | BANDWIDTH (Mbps) | DELAY (msec) |
|---|---|---|
| PATH A | 1.2 | 60 |
| PATH B | 0.3 | 500 |

Figure 7:
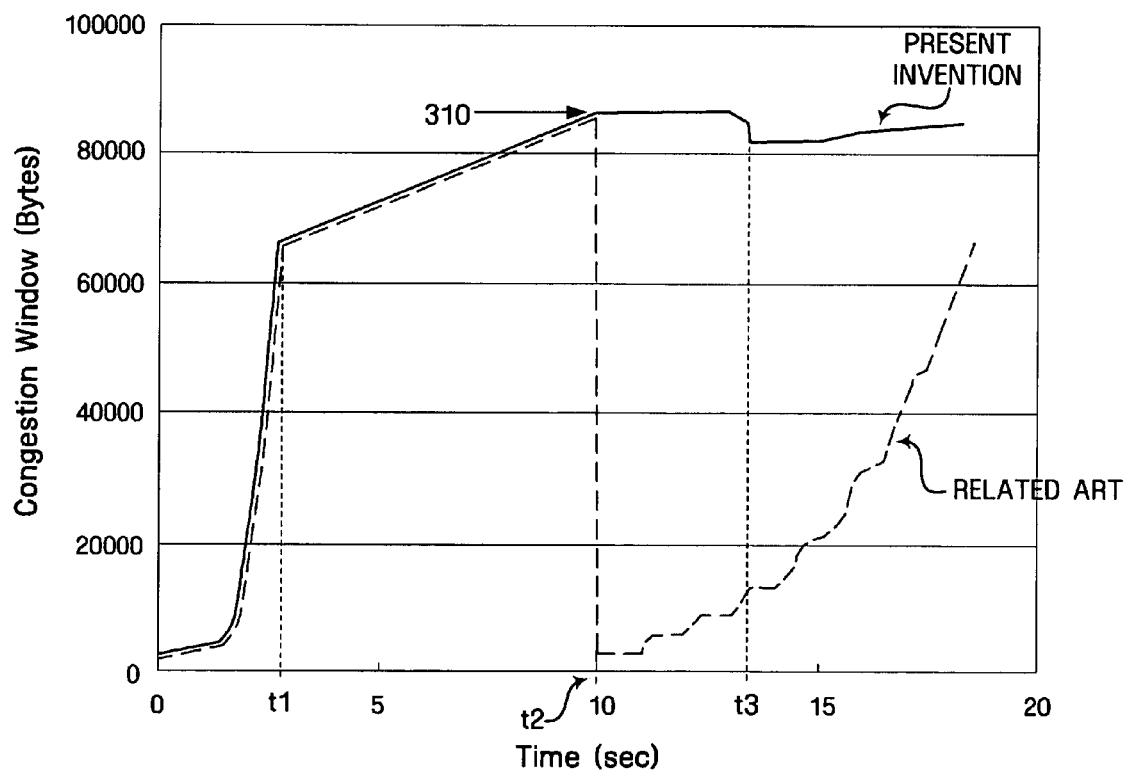
FIG. 7 is a diagram showing a change in transmission rate of the related art and a change in transmission rate of the exemplary embodiment of the present invention according to a first simulation result for comparison.

FIG. 7 is a diagram showing a change in the transmission rate of the related art and a change in the transmission rate of the embodiment of the present invention according to a first simulation result for comparison. In this simulation, the primary path is changed from the path A to the path B, and the packet loss does not occur before the change of the primary path. Since the packet loss does not occur, the condition for the reduction of the transmission rate is not generated, and thus the process in FIG. 3 is omitted.

Referring to the graph of FIG. 7, it can be understood that the slow-start process in which the congestion window is exponentially increased to the time t1 and then the congestion avoidance process in which the congestion window is linearly increased to the time t2 are executed. The related art and the present invention exhibit the same result until then.

Subsequently, when the handover is generated at the time t2 and the path for packet transmission is changed from the path A to the path B, in the related art, the congestion window is changed to the default value and the transmission rate is drastically reduced.

In contrast, according to the present invention, even though the handover is generated at the time t2 and the path B is used, the congestion window 310 and the slow-start threshold lastly used in the path A immediately before the handover is generated are used in the path B continuously, and thus a drastic reduction in the transmissive display region does not occur. This can be executed through operation S240 in FIG. 4.

Since the communication environment of the path A is worse than the communication environment of the path A, it may be impossible to use, in the path B, the transmission rate used in the path A as it is. However, it can be understood that the communication device 210 receives the response packet from the destination device and reduces the congestion window and the slow-start threshold by the amount of lost packets identified through the response packet at the time t3. Accordingly, a stable transmission rate suitable for the environment of the path B can be used. This can be executed through the process of FIG. 5.

FIG. 8 is a diagram showing a change in the transmission rate of the related art and a change in the transmission rate of the embodiment of the present invention according to a second simulation result for comparison. In this simulation, the primary path is changed from the path A to the path B, and the transmission rate is reduced due to the packet loss before the change of the primary path.

Referring to the graph of FIG. 8, it can be understood that the slow-start process in which the congestion window is exponentially increased to the time t4 and then the congestion avoidance process in which the congestion window is linearly increased to the time t5 are executed.

In this case, since the retransmission timeout is generated at the time t5, the congestion window is set to the default value 330, and the transmission rate is reduced. Then, the slow-start process is executed to the time t6 again. The related art and the present invention exhibit the same result until then. However, according to the present invention, the congestion window 320 and the slow-start threshold immediately before the transmission rate is reduced are stored by the communication device 210. This can be executed through the process of FIG. 3. In this simulation, it is assumed that the retransmission timeout is generated. Alternately, when the fast retransmission is generated, the congestion window and the slow-start threshold are changed to be about half of the congestion window 320 at the time t5. Subsequent operations are as described below.

When the handover is generated and the path for packet transmission is changed from the path A to the path B at the time t6, in the related art, the congestion window is changed to the default value 330 again, and the transmission rate is reduced. In contrast, according to the present invention, the congestion window 320 and the slow-start threshold stored at the time t5 are used in the path B, and thus the transmission rate is increased. This can be executed through operation S250 in FIG. 4.

Since the communication environment of the path B is worse than the communication environment of the path A, it may be impossible to use, in the path B, the transmission rate used in the path A as it is. However, it can be understood that the communication device 210 receives the response packet from the destination device 220 and reduces the congestion window and the slow-start threshold by the amount of lost packets identified through the response packet at the time t7. Accordingly, a stable transmission rate suitable for the path B can be used. This can be executed through the process of FIG. 5.

As described above, if the handover is generated from the path having a poor communication environment to the path having a superior communication environment, the process of adapting the transmission rate described with reference to FIG. 5 can be omitted. Accordingly, as another simulation example of the present invention, when the primary path is changed from the path B to the path A, the operation of reducing the transmission rate at the time t3 of FIG. 7 and the time t7 of FIG. 8 may not be executed.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

According to the method of controlling a transmission rate and the communication device using the same according to the exemplary embodiments of the present invention described above, the transmission rate when the path is changed for packet transmission can be efficiently controlled.

What is claimed is:

1. A method of controlling a transmission rate, the method comprising:
    establishing, via multi-homing, a plurality of communication paths between a first communication device and a second communication device;
    setting a first path among the plurality of communication paths as a path for packet transmission or reception,
    changing the first path of the plurality of communication paths for packet transmission or reception from the first path to a second path among the plurality of communication paths;
    setting a congestion window and a slow-start threshold to be used in the second path to a congestion window and a slow-start threshold used in the first path and stored before the changing of the path for packet transmission or reception; and
    adapting the congestion window and the slow-start threshold to be used in the second path according to a packet loss generated in the second path, wherein the adapting the congestion window and the slow-start threshold to be used in the second path comprises:
transmitting packets by an amount corresponding to the set congestion window through the second path; and
changing the slow-start threshold to be used in the second path to a value which is obtained by subtracting an amount of lost packets among the transmitted packets from the set slow-start threshold, and changing the congestion window to be used in the second path to a value which is equal to the changed slow-start threshold.

2. The method of claim 1, wherein the changing of the path for packet transmission is performed according to a handover.

3. The method of claim 1, further comprising:
receiving a response packet sent in response to the transmitted packets; and
determining whether the lost packets among the transmitted packets exist through the response packet.

4. The method of claim 1, wherein the adapting the congestion window and the slow-start threshold to be used in the second path comprises:
transmitting packets by an amount corresponding to the set congestion window through the second path; and
changing the slow-start threshold to be used in the second path to a larger value of a value, which is obtained by subtracting an amount of lost packets among the transmitted packets from the congestion window to be used in the second path, and a limit initial value of the congestion window to be used in the second path, and changing the congestion window to be used in the second path to a value which is equal to the changed slow-start threshold.

5. The method of claim 1, wherein, if a stored congestion window and a stored slow-start threshold used in the first path exist and a time difference between a storage time of the stored congestion window and the stored slow-start threshold and a time at which the changing is executed is less than a first threshold time, the congestion window and the slow-start threshold used in the first path are set to the stored congestion window and the stored slow-start threshold, and
if the stored congestion window and the stored slow-start threshold do not exist or the time difference between the storage time and the time at which the changing is executed is equal to or greater than the first threshold time, the congestion window and the slow-start threshold lastly used in the first path before the changing is executed are stored, and the congestion window and the slow-start threshold used in the first path are set to the stored congestion window and the stored slow-start threshold.

6. The method of claim 5, further comprising a condition for the reduction of the transmission rate in the first path occurs:
if the stored congestion window and the stored slow-start threshold exist and a time difference between an occurrence time of the condition for the reduction of the transmission rate and the storage time of the stored congestion window and the stored slow-start threshold is less than a second threshold time, updating the storage time of the stored congestion window and the stored slow-start threshold to the occurrence time of the condition for the reduction of the transmission rate; and
if the stored congestion window and the stored slow-start threshold do not exist or the time difference between the occurrence time of the condition for the reduction of the transmission rate and the storage time of the stored congestion window and the stored slow-start threshold is equal to or greater than the second threshold time, storing the congestion window and the slow-start threshold at the occurrence time of the condition for the reduction of the transmission rate.

7. The method of claim 6, wherein the condition for the reduction of the transmission rate includes the occurrence of a retransmission timeout or consecutive lost packets equal to or greater than a threshold number of lost packets.

8. A communication device comprising:
a multi-homing support module which establishes a plurality of communication paths with another communication device, sets a first path of the plurality of communication paths as a path for packet transmission or reception, and changes the first path for packet transmission or reception to a second path among the plurality of communication paths upon handover;
a control information managing module which sets a congestion window and a slow-start threshold to be used in the second path to a congestion window and a slow-start threshold used in the first path and stored before the multi-homing support module changes the path for packet transmission or reception, and adapts the congestion window and the slow-start threshold to be used in the second path according to a packet loss generated in the second path; and
a control module which controls a transmission rate according to the congestion window and the slow-start threshold to be managed by the control information managing module,
an interface module which transmits packets by an amount corresponding to the set congestion window to other communication devices and receives a response packet sent in response to the transmitted packets,
wherein the control information managing module comprises:
a response packet processing module which identifies lost packets among the transmitted packets through the response packet, and
a parameter adapting module which changes the slow-start threshold to be used in the second path to a value obtained by subtracting an amount of lost packets identified by the response packet processing module from the set slow-start threshold, and changes the congestion window to be used in the second path to a value equal to the changed slow-start threshold,
wherein at least one of the multi-homing support module, the control information managing module, the control module and the interface module is a hardware component.

9. A communication device comprising:
a multi-homing support module which establishes a plurality of communication paths with another communication device, sets a first path of the plurality of communication paths as a path for packet transmission or reception, and changes the first path for packet transmission or reception to a second path among the plurality of communication paths upon handover;
a control information managing module which sets a congestion window and a slow-start threshold to be used in the second path to a congestion window and a slow-start threshold used in the first path and stored before the multi-homing support module changes the path for packet transmission or reception, and adapts the congestion window and the slow-start threshold to be used in the second path according to a packet loss generated in the second path; and a control module which controls a transmission rate according to the congestion window and the slow-start threshold to be managed by the control information managing module, an interface module which transmits packets by an amount corresponding to the set congestion window to other communication devices and receives a response packet sent in response the transmitted packets, wherein the control information managing module comprises:

a response packet processing module which identifies lost packets among the transmitted packets through the response packet, and a parameter adapting module which changes the slow-start threshold to be used in the second path to a larger value of a value, which is obtained by subtracting the amount of lost packets identified by the response packet processing module from the congestion window to be used in the second path, and a limit initial value of the congestion window to be used in the second path, and changes the congestion window to be used in the second path to a value equal to the changed slow-start threshold, and wherein at least one of the multi-homing support module, the control information managing module, the control module and the interface module is a hardware component.

10. The communication device of claim 8, wherein, if a stored congestion window and a stored slow-start threshold used in the first path exist and a time difference between a storage time of the stored congestion window and the stored slow-start threshold and a time at which the changing is executed is less than a first threshold time, the congestion window and the slow-start threshold used in the first path are set to the stored congestion window and the stored slow-start threshold, and if the stored congestion window and the stored slow-start threshold do not exist or the time difference between the storage time and the time at which the changing is executed is equal to or greater than the first threshold time, the congestion window and the slow-start threshold lastly used in the first path before the changing is executed are stored, and the congestion window and the slow-start threshold used in the first path are set to the stored congestion window and the stored slow-start threshold.

11. The communication device of claim 10, wherein the response packet processing module determines whether a condition for the reduction of the transmission rate through the response packet occurs, and wherein the control information managing module comprises:

a storage module which, if the response packet processing module determines that the condition for the reduction of the transmission rate in the first path occurs, and if the stored congestion window and the stored slow-start threshold exist and a time difference between occurrence time of the condition for the reduction of the transmission rate and the storage time of the stored congestion window and the stored slow-start threshold is less than a second threshold time, updates the storage time of the stored congestion window and the stored slow-start threshold to the occurrence time of the condition for the reduction of the transmission rate, and if the stored congestion window and the stored slow-start threshold do not exist or the time difference between the occurrence time of the condition for the reduction of the transmission rate and the storage time of the stored congestion window and the stored slow-start threshold is equal to or greater than the second threshold time, stores the congestion window and the slow-start threshold at the occurrence time of the condition for the reduction of the transmission rate.

12. The communication device of claim 11, wherein condition for the reduction of the transmission rate includes the occurrence of a retransmission timeout or consecutive lost packets equal to or greater than a threshold number of lost packets.

13. A method of controlling a transmission rate, the method comprising:

changing a path for packet transmission or reception from a first path to a second path;

setting a congestion window and a slow-start threshold to be used in the second path to a congestion window and a slow-start threshold used in the first path and stored before the changing of the path for packet transmission or reception; and adapting the congestion window and the slow-start threshold to be used in the second path according to a packet loss generated in the second path, wherein, if a stored congestion window and a stored slow-start threshold used in the first path exist and a time difference between a storage time of the stored congestion window and the stored slow-start threshold and a time at which the changing is executed is less than a first threshold time, the congestion window and the slow-start threshold used in the first path are set to the stored congestion window and the stored slow-start threshold, and if the stored congestion window and the stored slow-start threshold do not exist or the time difference between the storage time and the time at which the changing is executed is equal to or greater than the first threshold time, the congestion window and the slow-start threshold lastly used in the first path before the changing is executed are stored, and the congestion window and the slow-start threshold used in the first path are set to the stored congestion window and the stored slow-start threshold.

14. A communication device comprising:

a multi-homing support module which establishes a plurality of paths to be communicatable with other communication devices, sets a first path among the plurality of paths as a path for packet transmission or reception, and changes the path for packet transmission or reception to a second path among the plurality of paths upon handover;

a control information managing module which sets a congestion window and a slow-start threshold to be used in the second path to a congestion window and a slow-start threshold used in the first path and stored before the multi-homing support module changes the path for packet transmission or reception, and adapts the congestion window and the slow-start threshold to be used in the second path according to a packet loss generated in the second path; and a control module which controls a transmission rate according to the congestion window and the slow-start threshold to be managed by the control information managing module, wherein, if a stored congestion window and a stored slow-start threshold used in the first path exist and a time difference between a storage time of the stored congestion window and the stored slow-start threshold and a time at which the changing is executed is less than a first threshold time, the congestion window and the slow-start threshold used in the first path are set to the stored congestion window and the stored slow-start threshold, and if the stored congestion window and the stored slow-start threshold do not exist or the time difference between the storage time and the time at which the changing is executed is equal to or greater than the first threshold time, the congestion window and the slow-start threshold lastly used in the first path before the changing is executed are stored, and the congestion window and the slow-start threshold used in the first path are set to the stored congestion window and the stored slow-start threshold, and wherein at least one of the multi-homing support module, the control information managing module and the control module is a hardware component.

* * * * *